United States Patent
Oomoto

[19]

[11] Patent Number: 5,621,543
[45] Date of Patent: Apr. 15, 1997

[54] SYSTEM FOR COMPRESSING A HALFTONE IMAGE AND METHOD THEREFOR

[75] Inventor: Ryuji Oomoto, Nagano, Japan

[73] Assignee: Seiko Epson Corporation, Tokyo, Japan

[21] Appl. No.: 495,193

[22] Filed: Jun. 27, 1995

[30] Foreign Application Priority Data

Jun. 27, 1994 [JP] Japan .................................... 6-144990

[51] Int. Cl.⁶ ................................ H04N 1/40; H04N 1/41
[52] U.S. Cl. ......................... 358/456; 358/455; 358/429; 382/237
[58] Field of Search .................................... 358/456, 429, 358/455, 298, 467, 459; 382/232, 233, 234, 235, 248, 237; 341/185, 200, 899; H04N 1/40, 1/41

[56] References Cited

U.S. PATENT DOCUMENTS 5,190,382  3/1993  Koshiishi .............................. 400/121

FOREIGN PATENT DOCUMENTS 0690613  3/1996  European Pat. Off. .
5173540  7/1993  Japan .

Primary Examiner—Edward L. Coles, Sr.
Assistant Examiner—Madeleine An Nguyen
Attorney, Agent, or Firm—Sughrue, Mion, Zinn, Macpeak & Seas

[57] ABSTRACT

In the case of a 4-fold density image, for example, 2-pixel areas in the 4-fold density image which are adjacent to each other are allocated with one 4-bit compression code, respectively. In this case, the possible patterns which can be produced by the 8-dot pattern of the 2-pixel area are limited to 16 kinds of patterns in which there is one or less black and white change. With respect to 2-bit portions of 4-bit compression codes which correspond to pixels, correspondence relationships between 2-bit portions and 4-dot patterns are set so that, when a 2-bit portion is inverted or converted into "11" in all bits or "00" in all bits, also the 4-dot pattern of the corresponding pixel is similarly inverted or converted into a pattern of all white dots or all black dot. Next, by combining the correspondence relationships of the 2-bit portions, 12 kinds of correspondence relationships between 4-bit compression codes and 8-dot patterns of two pixels are produced. With respect to four dot patterns to which the relationships cannot be applied, furthermore, relationships between the patterns and compression codes are set so that, when a compression code is inverted, also the 8-dot pattern is inverted. A 4-fold density image is represented by using the 16 kinds of compression codes.

17 Claims, 17 Drawing Sheets

FIG. 2(A)

| 2-BIT CODE | 4-DOT PATTERN FOR A PIXEL |
|---|---|
| 00 | = 0000 |
| 01 | = 0001 OR 1000 |
| 10 | = 0111 OR 1110 |
| 11 | = 1111 |

FIG. 2(B)

| COMPRESSION CODE | 8-DOT PATTERN FOR 2-PIXEL |
|---|---|
| 0000 | = 00000000 |
| 0001 | = 00000001 |
| 0010 | = 00000111 |
| 0011 | = 00001111 |
| 0100 | = 10000000 |
| 1000 | = 11100000 |
| 1100 | = 11110000 |
| 0111 | = 00011111 |
| 1011 | = 01111111 |
| 1101 | = 11111000 |
| 1110 | = 11111110 |
| 1111 | = 11111111 |

FIG. 2(C)

| COMPRESSION CODE | 8-DOT PATTERN FOR 2-PIXEL |
|---|---|
| 0101 | = 00000011 |
| 1010 | = 11111100 |
| 0110 | = 00111111 |
| 1001 | = 11000000 |

FIG. 3

| COMPRESSION CODE | 8-DOT PATTERN FOR 2-PIXEL |
|---|---|
| 0000 | : 00000000 |
| 0001 | : 00000001 |
| 0010 | : 00000111 |
| 0011 | : 00001111 |
| 0100 | : 10000000 |
| 0101 | : 00000011 |
| 0110 | : 00111111 |
| 0111 | : 00011111 |
| 1000 | : 11100000 |
| 1001 | : 11000000 |
| 1010 | : 11111100 |
| 1011 | : 01111111 |
| 1100 | : 11110000 |
| 1101 | : 11111000 |
| 1110 | : 11111110 |
| 1111 | : 11111111 |

FIG. 5(A)

AND: CONVERT HIGH ORDER 2 BITS INTO "00"

| CODE | CODE AFTER OPERATION | RESULT | CORRECT PATTERN | |
|------|----------------------|----------|----------|---|
| 0000 | 0000 | 00000000 | 00000000 | |
| 0001 | 0001 | 00000001 | 00000001 | |
| 0010 | 0010 | 00000111 | 00000111 | |
| 0011 | 0011 | 00001111 | 00001111 | |
| 0100 | 0000 | 00000000 | 00000000 | |
| 0101 | 0001 | 00000001 | 00000011 | ERROR 1/1200 |
| 0110 | 0010 | 00000111 | 00001111 | ERROR 1/1200 |
| 0111 | 0011 | 00001111 | 00001111 | |
| 1000 | 0000 | 00000000 | 00000000 | |
| 1001 | 0001 | 00000001 | 00000000 | ERROR 1/1200 |
| 1010 | 0010 | 00000111 | 00000011 | ERROR 1/1200 |
| 1011 | 0011 | 00001111 | 00001111 | |
| 1100 | 0000 | 00000000 | 00000000 | |
| 1101 | 0001 | 00000001 | 00000001 | |
| 1110 | 0010 | 00000111 | 00000111 | |
| 1111 | 0011 | 00001111 | 00001111 | |

FIG. 5(B)

AND: CONVERT LOW ORDER 2 BITS INTO "00"

| CODE | CODE AFTER OPERATION | RESULT | CORRECT PATTERN | |
|------|----------------------|----------|----------|---|
| 0000 | 0000 | 00000000 | 00000000 | |
| 0001 | 0000 | 00000000 | 00000000 | |
| 0010 | 0000 | 00000000 | 00000000 | |
| 0011 | 0000 | 00000000 | 00000000 | |
| 0100 | 0100 | 10000000 | 10000000 | |
| 0101 | 0100 | 10000000 | 00000000 | ERROR 1/1200 |
| 0110 | 0100 | 10000000 | 11000000 | ERROR 1/1200 |
| 0111 | 0100 | 10000000 | 10000000 | |
| 1000 | 1000 | 11100000 | 11100000 | |
| 1001 | 1000 | 11100000 | 11000000 | ERROR 1/1200 |
| 1010 | 1000 | 11100000 | 11110000 | ERROR 1/1200 |
| 1011 | 1000 | 11100000 | 11100000 | |
| 1100 | 1100 | 11110000 | 11110000 | |
| 1101 | 1100 | 11110000 | 11110000 | |
| 1110 | 1100 | 11110000 | 11110000 | |
| 1111 | 1100 | 11110000 | 11110000 | |

FIG. 7(A)

OR : CONVERT LOW ORDER 2 BITS INTO "11"

| CODE | CODE AFTER OPERATION | RESULT | CORRECT PATTERN | |
|------|------|------|------|------|
| 0000 | 0011 | 00001111 | 00001111 | |
| 0001 | 0011 | 00001111 | 00001111 | |
| 0010 | 0011 | 00001111 | 00001111 | |
| 0011 | 0011 | 00001111 | 00001111 | |
| 0100 | 0111 | 00011111 | 00011111 | |
| 0101 | 0111 | 00011111 | 00001111 | ERROR 1/1200 |
| 0110 | 0111 | 00011111 | 00111111 | ERROR 1/1200 |
| 0111 | 0111 | 00011111 | 00011111 | |
| 1000 | 1011 | 01111111 | 01111111 | |
| 1001 | 1011 | 01111111 | 00111111 | ERROR 1/1200 |
| 1010 | 1011 | 01111111 | 11111111 | ERROR 1/1200 |
| 1011 | 1011 | 01111111 | 01111111 | |
| 1100 | 1111 | 11111111 | 11111111 | |
| 1101 | 1111 | 11111111 | 11111111 | |
| 1110 | 1111 | 11111111 | 11111111 | |
| 1111 | 1111 | 11111111 | 11111111 | |

FIG. 7(B)

OR : CONVERT HIGH ORDER 2 BITS INTO "11"

| CODE | CODE AFTER OPERATION | RESULT | CORRECT PATTERN | |
|------|------|------|------|------|
| 0000 | 1100 | 11110000 | 11110000 | |
| 0001 | 1101 | 11111000 | 11111000 | |
| 0010 | 1110 | 11111110 | 11111110 | |
| 0011 | 1111 | 11111111 | 11111111 | |
| 0100 | 1100 | 11110000 | 11110000 | |
| 0101 | 1101 | 11111000 | 11111100 | ERROR 1/1200 |
| 0110 | 1110 | 11111110 | 11111111 | ERROR 1/1200 |
| 0111 | 1111 | 11111111 | 11111111 | |
| 1000 | 1100 | 11110000 | 11110000 | |
| 1001 | 1101 | 11111000 | 11110000 | ERROR 1/1200 |
| 1010 | 1110 | 11111110 | 11111100 | ERROR 1/1200 |
| 1011 | 1111 | 11111111 | 11111111 | |
| 1100 | 1100 | 11110000 | 11110000 | |
| 1101 | 1101 | 11111000 | 11111000 | |
| 1110 | 1110 | 11111110 | 11111110 | |
| 1111 | 1111 | 11111111 | 11111111 | |

FIG. 8(A)

XOR : INVERT WHOLE OF CODE

| CODE | CODE AFTER OPERATION | RESULT | CORRECT PATTERN |
|---|---|---|---|
| 0000 | 1111 | 11111111 | 11111111 |
| 0001 | 1110 | 11111110 | 11111110 |
| 0010 | 1101 | 11111000 | 11111000 |
| 0011 | 1100 | 11110000 | 11110000 |
| 0100 | 1011 | 01111111 | 01111111 |
| 0101 | 1010 | 11111100 | 11111100 |
| 0110 | 1001 | 11000000 | 11000000 |
| 0111 | 1000 | 11100000 | 11100000 |
| 1000 | 0111 | 00011111 | 00011111 |
| 1001 | 0110 | 00111111 | 00111111 |
| 1010 | 0101 | 00000011 | 00000011 |
| 1011 | 0100 | 10000000 | 10000000 |
| 1100 | 0011 | 00001111 | 00001111 |
| 1101 | 0010 | 00000111 | 00000111 |
| 1110 | 0001 | 00000001 | 00000001 |
| 1111 | 0000 | 00000000 | 00000000 |

FIG. 8(B)

XOR : INVERT LOW ORDER 2 BITS

| CODE | CODE AFTER OPERATION | RESULT | CORRECT PATTERN | |
|---|---|---|---|---|
| 0000 | 0011 | 00001111 | 00001111 | |
| 0001 | 0010 | 00000111 | 00000111 | |
| 0010 | 0001 | 00000001 | 00000001 | |
| 0011 | 0000 | 00000000 | 00000000 | |
| 0100 | 0111 | 00011111 | 00011111 | |
| 0101 | 0110 | 00111111 | 00000011 | ERROR 4/1200 |
| 0110 | 0101 | 00000011 | 11000000 | ERROR 4/1200 |
| 0111 | 0100 | 10000000 | 10000000 | |
| 1000 | 1011 | 01111111 | 01111111 | |
| 1001 | 1010 | 11111100 | 00111111 | ERROR 4/1200 |
| 1010 | 1001 | 11000000 | 11111100 | ERROR 4/1200 |
| 1011 | 1000 | 11100000 | 11100000 | |
| 1100 | 1111 | 11111111 | 11111111 | |
| 1101 | 1110 | 11111110 | 11111110 | |
| 1110 | 1101 | 11111000 | 11111000 | |
| 1111 | 1100 | 11110000 | 11110000 | |

FIG. 8(C)

XOR : INVERT HIGH ORDER 2 BITS

| CODE | CODE AFTER OPERATION | RESULT | CORRECT PATTERN | |
|---|---|---|---|---|
| 0000 | 1100 | 11110000 | 11110000 | |
| 0001 | 1101 | 11111000 | 11111000 | |
| 0010 | 1110 | 11111110 | 11111110 | |
| 0011 | 1111 | 11111111 | 11111111 | |
| 0100 | 1000 | 11100000 | 11100000 | |
| 0101 | 1001 | 11000000 | 11111100 | ERROR 4/1200 |
| 0110 | 1010 | 11111100 | 00111111 | ERROR 4/1200 |
| 0111 | 1011 | 01111111 | 01111111 | |
| 1000 | 0100 | 10000000 | 10000000 | |
| 1001 | 0101 | 00000011 | 11000000 | ERROR 4/1200 |
| 1010 | 0110 | 00111111 | 00000011 | ERROR 4/1200 |
| 1011 | 0111 | 00011111 | 00011111 | |
| 1100 | 0000 | 00000000 | 00000000 | |
| 1101 | 0001 | 00000001 | 00000001 | |
| 1110 | 0010 | 00000111 | 00000111 | |
| 1111 | 0011 | 00001111 | 00001111 | |

FIG. 11

| di | CODE (di, p)<br>0 1 2 3 4 5 6 7=p |
|---|---|
| 0 | 0, 0, 0, 0, 0, 0, 0, 0 |
| 1 | 0, 0, 0, 0, 0, 0, 0, 0 |
| 2 | 0, 0, 0, 4, 0, 0, 0, 0 |
| 3 | 0, 0, 0, 4, 0, 0, 0, 0 |
| 4 | 0, 0, 0, 4, 0, 0, 0, 0 |
| 5 | 0, 0, 0, 4, 0, 0, 0, 0 |
| 6 | 0, 0, 0, 4, 0, 0, 4, 0 |
| 7 | 0, 0, 0, 4, 0, 0, 4, 0 |
| 8 | 0, 0, 0, 4, 0, 0, 4, 0 |
| 9 | 0, 0, 0, 4, 0, 0, 4, 0 |
| 10 | 0, 0, 0, 9, 0, 0, 4, 0 |
| 11 | 0, 0, 0, 9, 0, 0, 4, 0 |
| 12 | 0, 0, 0, 9, 0, 0, 4, 0 |
| 13 | 0, 0, 0, 9, 0, 0, 4, 0 |
| 14 | 0, 0, 0, 9, 0, 0, 9, 0 |
| 15 | 0, 0, 0, 9, 0, 0, 9, 0 |
| 16 | 0, 0, 0, 9, 0, 0, 9, 0 |
| 17 | 0, 0, 0, 9, 0, 0, 9, 0 |
| 18 | 0, 0, 1, 9, 0, 0, 9, 0 |
| 19 | 0, 0, 1, 9, 0, 0, 9, 0 |
| 20 | 0, 0, 1, 9, 0, 0, 9, 0 |
| 21 | 0, 0, 1, 9, 0, 0, 9, 0 |
| 22 | 0, 0, 1, 9, 0, 0, 9, 1 |
| 23 | 0, 0, 1, 9, 0, 0, 9, 1 |
| 24 | 0, 0, 1, 9, 0, 0, 9, 1 |
| 25 | 0, 0, 1, 9, 0, 0, 9, 1 |
| 26 | 0, 0, 5, 9, 0, 0, 9, 1 |
| 27 | 0, 0, 5, 9, 0, 0, 9, 1 |
| 28 | 0, 0, 5, 9, 0, 0, 9, 1 |
| 29 | 0, 0, 5, 9, 0, 0, 9, 1 |
| 30 | 0, 0, 5, 9, 0, 0, 9, 5 |
| 31 | 0, 0, 5, 9, 0, 0, 9, 5 |

| di | CODE (di, p)<br>0 1 2 3 4 5 6 7=p |
|---|---|
| 32 | 0, 0, 5, 9, 0, 0, 9, 5 |
| 33 | 0, 0, 5, 9, 0, 0, 9, 5 |
| 34 | 0, 0, 5, 8, 0, 0, 9, 5 |
| 35 | 0, 0, 5, 8, 0, 0, 9, 5 |
| 36 | 0, 0, 5, 8, 0, 0, 9, 5 |
| 37 | 0, 0, 5, 8, 0, 0, 9, 5 |
| 38 | 0, 0, 5, 8, 0, 0, 8, 5 |
| 39 | 0, 0, 5, 8, 0, 0, 8, 5 |
| 40 | 0, 0, 5, 8, 0, 0, 8, 5 |
| 41 | 0, 0, 5, 8, 0, 0, 8, 5 |
| 42 | 0, 0, 5, 8, 0, 4, 8, 5 |
| 43 | 0, 0, 5, 8, 0, 4, 8, 5 |
| 44 | 0, 0, 5, 8, 0, 4, 8, 5 |
| 45 | 0, 0, 5, 8, 0, 4, 8, 5 |
| 46 | 4, 0, 5, 8, 0, 4, 8, 5 |
| 47 | 4, 0, 5, 8, 0, 4, 8, 5 |
| 48 | 4, 0, 5, 8, 0, 4, 8, 5 |
| 49 | 4, 0, 5, 8, 0, 4, 8, 5 |
| 50 | 4, 0, 2, 8, 0, 4, 8, 5 |
| 51 | 4, 0, 2, 8, 0, 4, 8, 5 |
| 52 | 4, 0, 2, 8, 0, 4, 8, 5 |
| 53 | 4, 0, 2, 8, 0, 4, 8, 5 |
| 54 | 4, 0, 2, 8, 0, 4, 8, 2 |
| 55 | 4, 0, 2, 8, 0, 4, 8, 2 |
| 56 | 4, 0, 2, 8, 0, 4, 8, 2 |
| 57 | 4, 0, 2, 8, 0, 4, 8, 2 |
| 58 | 4, 0, 2, 8, 1, 4, 8, 2 |
| 59 | 4, 0, 2, 8, 1, 4, 8, 2 |
| 60 | 4, 0, 2, 8, 1, 4, 8, 2 |
| 61 | 4, 0, 2, 8, 1, 4, 8, 2 |
| 62 | 4, 1, 2, 8, 1, 4, 8, 2 |
| 63 | 4, 1, 2, 8, 1, 4, 8, 2 |

FIG. 12

| di | CODE (di, p) 0 1 2 3 4 5 6 7=p |
|---|---|
| 64 | 4, 1, 2, 8, 1, 4, 8, 2 |
| 65 | 4, 1, 2, 8, 1, 4, 8, 2 |
| 66 | 4, 1, 2, 8, 1, 9, 8, 2 |
| 67 | 4, 1, 2, 8, 1, 9, 8, 2 |
| 68 | 4, 1, 2, 8, 1, 9, 8, 2 |
| 69 | 4, 1, 2, 8, 1, 9, 8, 2 |
| 70 | 9, 1, 2, 8, 1, 9, 8, 2 |
| 71 | 9, 1, 2, 8, 1, 9, 8, 2 |
| 72 | 9, 1, 2, 8, 1, 9, 8, 2 |
| 73 | 9, 1, 2, 8, 1, 9, 8, 2 |
| 74 | 9, 1, 2, c, 1, 9, 8, 2 |
| 75 | 9, 1, 2, c, 1, 9, 8, 2 |
| 76 | 9, 1, 2, c, 1, 9, 8, 2 |
| 77 | 9, 1, 2, c, 1, 9, 8, 2 |
| 78 | 9, 1, 2, c, 1, 9, c, 2 |
| 79 | 9, 1, 2, c, 1, 9, c, 2 |
| 80 | 9, 1, 2, c, 1, 9, c, 2 |
| 81 | 9, 1, 2, c, 1, 9, c, 2 |
| 82 | 9, 1, 2, c, 5, 9, c, 2 |
| 83 | 9, 1, 2, c, 5, 9, c, 2 |
| 84 | 9, 1, 2, c, 5, 9, c, 2 |
| 85 | 9, 1, 2, c, 5, 9, c, 2 |
| 86 | 9, 5, 2, c, 5, 9, c, 2 |
| 87 | 9, 5, 2, c, 5, 9, c, 2 |
| 88 | 9, 5, 2, c, 5, 9, c, 2 |
| 89 | 9, 5, 2, c, 5, 9, c, 2 |
| 90 | 9, 5, 2, c, 2, 9, c, 2 |
| 91 | 9, 5, 2, c, 2, 9, c, 2 |
| 92 | 9, 5, 2, c, 2, 9, c, 2 |
| 93 | 9, 5, 2, c, 2, 9, c, 2 |
| 94 | 9, 2, 2, c, 2, 9, c, 2 |
| 95 | 9, 2, 2, c, 2, 9, c, 2 |

| di | CODE (di, p) 0 1 2 3 4 5 6 7=p |
|---|---|
| 96 | 9, 2, 2, c, 2, 9, c, 2 |
| 97 | 9, 2, 2, c, 2, 9, c, 2 |
| 98 | 9, 2, 2, c, 2, 8, c, 2 |
| 99 | 9, 2, 2, c, 2, 8, c, 2 |
| 100 | 9, 2, 2, c, 2, 8, c, 2 |
| 101 | 9, 2, 2, c, 2, 8, c, 2 |
| 102 | 8, 2, 2, c, 2, 8, c, 2 |
| 103 | 8, 2, 2, c, 2, 8, c, 2 |
| 104 | 8, 2, 2, c, 2, 8, c, 2 |
| 105 | 8, 2, 2, c, 2, 8, c, 2 |
| 106 | 8, 2, 2, c, 2, c, c, 2 |
| 107 | 8, 2, 2, c, 2, c, c, 2 |
| 108 | 8, 2, 2, c, 2, c, c, 2 |
| 109 | 8, 2, 2, c, 2, c, c, 2 |
| 110 | c, 2, 2, c, 2, c, c, 2 |
| 111 | c, 2, 2, c, 2, c, c, 2 |
| 112 | c, 2, 2, c, 2, c, c, 2 |
| 113 | c, 2, 2, c, 2, c, c, 2 |
| 114 | c, 2, 2, d, 2, c, c, 2 |
| 115 | c, 2, 2, d, 2, c, c, 2 |
| 116 | c, 2, 2, d, 2, c, c, 2 |
| 117 | c, 2, 2, d, 2, c, c, 2 |
| 118 | c, 2, 2, d, 2, c, d, 2 |
| 119 | c, 2, 2, d, 2, c, d, 2 |
| 120 | c, 2, 2, d, 2, c, d, 2 |
| 121 | c, 2, 2, d, 2, c, d, 2 |
| 122 | c, 2, 2, a, 2, c, d, 2 |
| 123 | c, 2, 2, a, 2, c, d, 2 |
| 124 | c, 2, 2, a, 2, c, d, 2 |
| 125 | c, 2, 2, a, 2, c, d, 2 |
| 126 | c, 2, 2, a, 2, c, a, 2 |
| 127 | c, 2, 2, a, 2, c, a, 2 |

FIG. 13

| di | CODE (di, p) 0 1 2 3 4 5 6 7=p |
|---|---|
| 128 | c, 2, 2, a, 2, c, a, 2 |
| 129 | c, 2, 2, a, 2, c, a, 2 |
| 130 | c, 2, 2, a, 2, d, a, 2 |
| 131 | c, 2, 2, a, 2, d, a, 2 |
| 132 | c, 2, 2, a, 2, d, a, 2 |
| 133 | c, 2, 2, a, 2, d, a, 2 |
| 134 | d, 2, 2, a, 2, d, a, 2 |
| 135 | d, 2, 2, a, 2, d, a, 2 |
| 136 | d, 2, 2, a, 2, d, a, 2 |
| 137 | d, 2, 2, a, 2, d, a, 2 |
| 138 | d, 2, 2, a, 2, a, a, 2 |
| 139 | d, 2, 2, a, 2, a, a, 2 |
| 140 | d, 2, 2, a, 2, a, a, 2 |
| 141 | d, 2, 2, a, 2, a, a, 2 |
| 142 | a, 2, 2, a, 2, a, a, 2 |
| 143 | a, 2, 2, a, 2, a, a, 2 |
| 144 | a, 2, 2, a, 2, a, a, 2 |
| 145 | a, 2, 2, a, 2, a, a, 2 |
| 146 | a, 2, 2, e, 2, a, a, 2 |
| 147 | a, 2, 2, e, 2, a, a, 2 |
| 148 | a, 2, 2, e, 2, a, a, 2 |
| 149 | a, 2, 2, e, 2, a, a, 2 |
| 150 | a, 2, 2, e, 2, a, e, 2 |
| 151 | a, 2, 2, e, 2, a, e, 2 |
| 152 | a, 2, 2, e, 2, a, e, 2 |
| 153 | a, 2, 2, e, 2, a, e, 2 |
| 154 | a, 2, 2, e, 2, e, e, 2 |
| 155 | a, 2, 2, e, 2, e, e, 2 |
| 156 | a, 2, 2, e, 2, e, e, 2 |
| 157 | a, 2, 2, e, 2, e, e, 2 |
| 158 | e, 2, 2, e, 2, e, e, 2 |
| 159 | e, 2, 2, e, 2, e, e, 2 |

| di | CODE (di, p) 0 1 2 3 4 5 6 7=p |
|---|---|
| 160 | e, 2, 2, e, 2, e, e, 2 |
| 161 | e, 2, 2, e, 2, e, e, 2 |
| 162 | e, 2, 3, e, 2, e, e, 2 |
| 163 | e, 2, 3, e, 2, e, e, 2 |
| 164 | e, 2, 3, e, 2, e, e, 2 |
| 165 | e, 2, 3, e, 2, e, e, 2 |
| 166 | e, 2, 3, e, 2, e, e, 3 |
| 167 | e, 2, 3, e, 2, e, e, 3 |
| 168 | e, 2, 3, e, 2, e, e, 3 |
| 169 | e, 2, 3, e, 2, e, e, 3 |
| 170 | e, 2, 3, e, 3, e, e, 3 |
| 171 | e, 2, 3, e, 3, e, e, 3 |
| 172 | e, 2, 3, e, 3, e, e, 3 |
| 173 | e, 2, 3, e, 3, e, e, 3 |
| 174 | e, 3, 3, e, 3, e, e, 3 |
| 175 | e, 3, 3, e, 3, e, e, 3 |
| 176 | e, 3, 3, e, 3, e, e, 3 |
| 177 | e, 3, 3, e, 3, e, e, 3 |
| 178 | e, 3, 7, e, 3, e, e, 3 |
| 179 | e, 3, 7, e, 3, e, e, 3 |
| 180 | e, 3, 7, e, 3, e, e, 3 |
| 181 | e, 3, 7, e, 3, e, e, 3 |
| 182 | e, 3, 7, e, 3, e, e, 7 |
| 183 | e, 3, 7, e, 3, e, e, 7 |
| 184 | e, 3, 7, e, 3, e, e, 7 |
| 185 | e, 3, 7, e, 3, e, e, 7 |
| 186 | e, 3, 6, e, 3, e, e, 7 |
| 187 | e, 3, 6, e, 3, e, e, 7 |
| 188 | e, 3, 6, e, 3, e, e, 7 |
| 189 | e, 3, 6, e, 3, e, e, 7 |
| 190 | e, 3, 6, e, 3, e, e, 6 |
| 191 | e, 3, 6, e, 3, e, e, 6 |

FIG. 14

| di | CODE (di, p)<br>0 1 2 3 4 5 6 7=p |
|---|---|
| 192 | e, 3, 6, e, 3, e, e, 6 |
| 193 | e, 3, 6, e, 3, e, e, 6 |
| 194 | e, 3, 6, f, 3, e, e, 6 |
| 195 | e, 3, 6, f, 3, e, e, 6 |
| 196 | e, 3, 6, f, 3, e, e, 6 |
| 197 | e, 3, 6, f, 3, e, e, 6 |
| 198 | e, 3, 6, f, 3, e, f, 6 |
| 199 | e, 3, 6, f, 3, e, f, 6 |
| 200 | e, 3, 6, f, 3, e, f, 6 |
| 201 | e, 3, 6, f, 3, e, f, 6 |
| 202 | e, 3, 6, f, 3, f, f, 6 |
| 203 | e, 3, 6, f, 3, f, f, 6 |
| 204 | e, 3, 6, f, 3, f, f, 6 |
| 205 | e, 3, 6, f, 3, f, f, 6 |
| 206 | f, 3, 6, f, 3, f, f, 6 |
| 207 | f, 3, 6, f, 3, f, f, 6 |
| 208 | f, 3, 6, f, 3, f, f, 6 |
| 209 | f, 3, 6, f, 3, f, f, 6 |
| 210 | f, 3, 6, f, 7, f, f, 6 |
| 211 | f, 3, 6, f, 7, f, f, 6 |
| 212 | f, 3, 6, f, 7, f, f, 6 |
| 213 | f, 3, 6, f, 7, f, f, 6 |
| 214 | f, 7, 6, f, 7, f, f, 6 |
| 215 | f, 7, 6, f, 7, f, f, 6 |
| 216 | f, 7, 6, f, 7, f, f, 6 |
| 217 | f, 7, 6, f, 7, f, f, 6 |
| 218 | f, 7, 6, f, 6, f, f, 6 |
| 219 | f, 7, 6, f, 6, f, f, 6 |
| 220 | f, 7, 6, f, 6, f, f, 6 |
| 221 | f, 7, 6, f, 6, f, f, 6 |
| 222 | f, 6, 6, f, 6, f, f, 6 |
| 223 | f, 6, 6, f, 6, f, f, 6 |

| di | CODE (di, p)<br>0 1 2 3 4 5 6 7=p |
|---|---|
| 224 | f, 6, 6, f, 6, f, f, 6 |
| 225 | f, 6, 6, f, 6, f, f, 6 |
| 226 | f, 6, b, f, 6, f, f, 6 |
| 227 | f, 6, b, f, 6, f, f, 6 |
| 228 | f, 6, b, f, 6, f, f, 6 |
| 229 | f, 6, b, f, 6, f, f, 6 |
| 230 | f, 6, b, f, 6, f, f, b |
| 231 | f, 6, b, f, 6, f, f, b |
| 232 | f, 6, b, f, 6, f, f, b |
| 233 | f, 6, b, f, 6, f, f, b |
| 234 | f, 6, b, f, b, f, f, b |
| 235 | f, 6, b, f, b, f, f, b |
| 236 | f, 6, b, f, b, f, f, b |
| 237 | f, 6, b, f, b, f, f, b |
| 238 | f, b, b, f, b, f, f, b |
| 239 | f, b, b, f, b, f, f, b |
| 240 | f, b, b, f, b, f, f, b |
| 241 | f, b, b, f, b, f, f, b |
| 242 | f, b, f, f, b, f, f, b |
| 243 | f, b, f, f, b, f, f, b |
| 244 | f, b, f, f, b, f, f, b |
| 245 | f, b, f, f, b, f, f, b |
| 246 | f, b, f, f, b, f, f, f |
| 247 | f, b, f, f, b, f, f, f |
| 248 | f, b, f, f, b, f, f, f |
| 249 | f, b, f, f, b, f, f, f |
| 250 | f, b, f, f, f, f, f, f |
| 251 | f, b, f, f, f, f, f, f |
| 252 | f, b, f, f, f, f, f, f |
| 253 | f, b, f, f, f, f, f, f |
| 254 | f, f, f, f, f, f, f, f |
| 255 | f, f, f, f, f, f, f, f |

FIG. 15(A)

| d1 | d2 |
|---|---|
| d3 | d4 |

GRADATION DATA 150dpi

FIG. 15(B)

| CODE (d1, 0) | CODE (d2, 1) |
|---|---|
| CODE (d1, 2) | CODE (d2, 3) |
| CODE (d3, 4) | CODE (d4, 5) |
| CODE (d3, 6) | CODE (d4, 7) |

CONVERSION TABLE

FIG. 15(C)

| 4bit CODE | 4bit CODE |
|---|---|
| 4bit CODE | 4bit CODE |
| 4bit CODE | 4bit CODE |
| 4bit CODE | 4bit CODE |

4-BIT COMPRESSION CODE

FIG. 16(A)

CODE
64 : 4, 1, 2, 8, 1, 4, 8, 2

| 0100 | 0001 |
|------|------|
| 0010 | 1000 |
| 0001 | 0100 |
| 1000 | 0010 |

4-BIT COMPRESSION CODE

FIG. 16(B)

| 10000000 | 00000001 |
|----------|----------|
| 00000111 | 11100000 |
| 00000001 | 10000000 |
| 11100000 | 00000111 |

4-FOLD DENSITY IMAGE

FIG. 17

4-BIT CODE   16-DOT PATTERN FOR A PIXEL

```
0000 = 00000000.00000000
0001 = 00000000.00000001
0010 = 00000000.00000011
0011 = 00000000.00000111
0100 = 00000000.00001111
0101 = 00000000.00011111
0110 = 00000000.00111111
0111 = 00000000.01111111
1000 = 11111111.10000000
1001 = 11111111.11000000
1010 = 11111111.11100000
1011 = 11111111.11110000
1100 = 11111111.11111000
1101 = 11111111.11111100
1110 = 11111111.11111110
1111 = 11111111.11111111
```
} OR SYMMETIC PATTERNS THEREOF

FIG. 18

| COMPRESSION CODE | 32-DOT PATTERN FOR 2-PIXEL |
|---|---|
| 00000000 | 00000000.00000000.00000000.00000000 |
| 00000001 | 00000000.00000000.00000000.00000001 |
| 00000010 | 00000000.00000000.00000000.00000011 |
| 00000011 | 00000000.00000000.00000000.00000111 |
| 00000100 | 00000000.00000000.00000000.00001111 |
| 00000101 | 00000000.00000000.00000000.00011111 |
| 00000110 | 00000000.00000000.00000000.00111111 |
| 00000111 | 00000000.00000000.00000000.01111111 |
| 00001000 | 00000000.00000000.00000001.11111111 |
| 00001001 | 00000000.00000000.00000011.11111111 |
| 00001010 | 00000000.00000000.00000111.11111111 |
| 00001011 | 00000000.00000000.00001111.11111111 |
| 00001100 | 00000000.00000000.00011111.11111111 |
| 00001101 | 00000000.00000000.00111111.11111111 |
| 00001110 | 00000000.00000000.01111111.11111111 |
| 00001111 | 00000000.00000000.11111111.11111111 |
| 00010000 | 10000000.00000000.00000000.00000000 |
| 00100000 | 11000000.00000000.00000000.00000000 |
| 00110000 | 11100000.00000000.00000000.00000000 |
| 01000000 | 11110000.00000000.00000000.00000000 |
| 01010000 | 11111000.00000000.00000000.00000000 |
| 01100000 | 11111100.00000000.00000000.00000000 |
| 01110000 | 11111110.00000000.00000000.00000000 |
| 10000000 | 11111111.10000000.00000000.00000000 |
| 10010000 | 11111111.11000000.00000000.00000000 |
| 10100000 | 11111111.11100000.00000000.00000000 |
| 10110000 | 11111111.11110000.00000000.00000000 |
| 11000000 | 11111111.11111000.00000000.00000000 |
| 11010000 | 11111111.11111100.00000000.00000000 |
| 11100000 | 11111111.11111110.00000000.00000000 |
| 11110000 | 11111111.11111111.00000000.00000000 |
| 00011111 | 00000000.00000001.11111111.11111111 |
| 00101111 | 00000000.00000011.11111111.11111111 |
| 00111111 | 00000000.00000111.11111111.11111111 |
| 01001111 | 00000000.00001111.11111111.11111111 |
| 01011111 | 00000000.00011111.11111111.11111111 |
| 01101111 | 00000000.00111111.11111111.11111111 |
| 01111111 | 00000000.01111111.11111111.11111111 |
| 10001111 | 00000001.11111111.11111111.11111111 |
| 10011111 | 00000011.11111111.11111111.11111111 |
| 10101111 | 00000111.11111111.11111111.11111111 |
| 10111111 | 00001111.11111111.11111111.11111111 |
| 11001111 | 00011111.11111111.11111111.11111111 |
| 11011111 | 00111111.11111111.11111111.11111111 |
| 11101111 | 01111111.11111111.11111111.11111111 |
| 11110001 | 11111111.11111111.10000000.00000000 |
| 11110010 | 11111111.11111111.11000000.00000000 |
| 11110011 | 11111111.11111111.11100000.00000000 |
| 11110100 | 11111111.11111111.11110000.00000000 |
| 11110101 | 11111111.11111111.11111000.00000000 |
| 11110110 | 11111111.11111111.11111100.00000000 |
| 11110111 | 11111111.11111111.11111110.00000000 |
| 11111000 | 11111111.11111111.11111111.10000000 |
| 11111001 | 11111111.11111111.11111111.11000000 |
| 11111010 | 11111111.11111111.11111111.11100000 |
| 11111011 | 11111111.11111111.11111111.11110000 |
| 11111100 | 11111111.11111111.11111111.11111000 |
| 11111101 | 11111111.11111111.11111111.11111100 |
| 11111110 | 11111111.11111111.11111111.11111110 |
| 11111111 | 11111111.11111111.11111111.11111111 |

FIG. 19(A)

| COMPRESSION CODE | 32-DOT PATTERN FOR 2-PIXEL |
|---|---|
| 00010111 | 00000000. 00000000. 00000000. 11111111 |
| 11101000 | 11111111. 11111111. 11111111. 00000000 |
| 10001110 | 00000000. 11111111. 11111111. 11111111 |
| 01110001 | 11111111. 00000000. 00000000. 00000000 |

FIG. 19(B)

| COMPRESSION CODE | 32-DOT PATTERN FOR 2-PIXEL |
|---|---|
| 00011000 | 00000000. 00000000. 00000000. 11111111 |
| 11100111 | 11111111. 11111111. 11111111. 00000000 |
| 01111110 | 00000000. 11111111. 11111111. 11111111 |
| 10000001 | 11111111. 00000000. 00000000. 00000000 |

SYSTEM FOR COMPRESSING A HALFTONE IMAGE AND METHOD THEREFOR

BACKGROUND OF THE INVENTION

1. Field of the Invention

The invention relates to a system for compressing a halftone image and a method therefor.

2. Related Art

In a terminal printer or the like of a computer system, when a binary image such as a character or a line drawing is to be printed, the image is represented by a normal dot matrix having the same vertical and horizontal resolutions, for example, 300 dpi vertical×300 dpi horizontal. Hereinafter, an image represented by a normal dot matrix is referred to as "normal image".

In contrast, when an image such as a photograph having a halftone is to be printed, the image is represented by a dot matrix of, for example, 300 dpi vertical×1,200 dpi horizontal, in which the horizontal (or vertical) resolution is greater than that of a normal dot matrix by the factor of N (in the example, fourfold). Hereinafter, an image having a resolution in one direction which is greater by the factor of N than that of a normal image is referred to as "N-fold density image". When an N-fold density image is used, a halftone can be represented by a black and white pattern in which N dots are formed in one pixel.

In the case where an N-fold density image is to be stored, a memory capacity which is greater by N times than that required for storing a normal image is required when the N-fold density image is stored as it is. When compression coding is done, it is possible to store such an image in a memory of a smaller capacity. In a basic, known compression coding method, one pixel represented by N dots is allocated a compression code having a number of bits in which all dot patterns that can be produced by N dots can be represented.

In the case of the above-mentioned 4-fold density image, for example, the number of possible dot patterns which can be produced by one pixel is 8 in total, i.e., two patterns in which all dots of the pixel are only white or only black, three patterns in which one, two, or three black dots are arranged with starting from the right end, and three patterns in which one, two, or three black dots are arranged with starting from the left end. Consequently, it is possible to use a 3-bit code as a compression code so that a required memory capacity is reduced to be only three times as much as that required for storing a normal image.

In another known method, compression coding is conducted in the following manner in order to attain a higher compression ratio. Two pixels which are horizontally adjacent to each other are set as a unit, and a fixed limitation is imposed on dot patterns which can be produced by the two pixels. Under this limitation, a compression code of a bit number by which all dot patterns that can be produced by two pixels can be represented is allocated. The limitation of the dot patterns is that there is one or less black and white change in the area of two pixels, or that the black and white pattern in the area of two pixels is always "white", "black", "white and black", or "black and white" so that two or more black and white changes such as "white, black, and white" or "black, white, and black" are not permitted.

In the case of a 4-fold density image, for example, according to this method, the number of possible kinds of dot patterns which can be produced by two pixels is 16 in total, i.e., two patterns in which all dots of the whole of the 2-pixel area are white or black, seven patterns in which black dots in the number of one of 1 to 7 are arranged with starting from the right end, and seven patterns in which black dots in the number of one of 1 to 7 are arranged with starting from the left end. Consequently, it is possible to use a 4-bit code as a compression code for each two pixels so that a required memory capacity is reduced to be two times as that required for storing a normal image.

The latter method of compression coding will be described more generally. The above-mentioned limitation for a dot pattern is imposed on an N-fold density image so that the number of possible kinds of the black and white patterns which can be produced by a 2-pixel area is limited to Under this limitation, two pixels are represented by an M-bit compression code which satisfies the relationship of $$4N=2^M.$$

This enables an N-fold density image to be stored in a memory of a capacity which is M/2 times as that required for storing a normal image.

In the case where an N-fold density image is to be merely stored, the latter prior art method of compression coding is effective. In the case where an N-fold density image is to be edited or processed, however, there arises a problem in that, when compression codes remain as they are, it is impossible to edit or process them.

In an editing process in which a positive photograph is inverted to a negative one, or characters are superposed on a photograph, for example, a NOT logical operation is conducted on an N-fold density image of the photograph, or an AND, OR, or XOR logical operation is conducted on an N-fold density image of the photograph and a normal image of the characters. When these logical operations are observed in the view point of the action of an N-fold density image on black and white patterns of pixels, the NOT operation means that black and white patterns of all pixels are inverted. The AND, OR, or XOR operation between an N-fold density image and a normal image (all dots of each pixel are black or white) is equivalent to the case where the black and white pattern of each pixel is converted into a pattern of all white dots or all black dots.

In a conventional compression code as described above, one M-bit code is provided for each two pixels. When one of the logical operations is conducted on such a compression code, the above-mentioned inversion or conversion is conducted on the portion of the compression code which portion corresponds to one of the pixels (i.e., the upper M/2-bit portion or the lower M/2-bit portion). However, the inversion or conversion conducted on a compression code does not always mean the same inversion or conversion as that which is to be conducted the black and white pattern of the pixel indicated by the compression code, or rather, often means conversion which is entirely different in content from the inversion or conversion to be conducted on the black and white pattern of the pixel.

As described above, when an editing process is conducted on a conventional compression code of an N-fold density image, it results in that a process which is entirely different from the intention of the editing process to have been conducted on black and white patterns of pixels before compression. Conventionally, therefore, an editing process of an N-fold density image is conducted in the following manner. First, compression codes are once returned to an original N-fold density image, and the editing process is conducted on the original N-fold density image. Thereafter, the resulting image is again converted into compression codes, and the compression codes are stored. This countermeasure also requires a memory of a capacity which is N times as that required for storing a normal image. Consequently, the merit of compression coding cannot fully be utilized.

SUMMARY OF THE INVENTION

It is an object of the invention to provide a system for conducting compression coding on an N-fold density halftone image in which a process of an N-fold density image, or an edition of an N-fold density image and a normal image can be conducted on compression codes as they are while attaining a compression ratio as high as that of the conventional one, whereby processing of an N-fold density image can completely be conducted by using only a memory of a capacity which is required for the compression codes.

The system for compressing a halftone image according to the invention comprises means for, under conditions that 2N-dot patterns which can be produced by a 2-pixel area of an N-fold density image for representing the halftone image are limited to 4N kinds of dot patterns in which there is one or less black and white change, conducting compression coding on the halftone image by using compression codes previously set for the 4N dot patterns, and each of the compression code is set so that, when the whole of the compression code is inverted, also 2N-dot patterns of a corresponding 2-pixel area are inverted.

In the system, furthermore, the compression codes are preferably set so as to satisfy one or both of the following conditions (1) and (2):

(1) when pixel-corresponding portions of each of the compression codes are separately converted into "1" in all bits or "0" in all bits, also an N-dot pattern of a corresponding pixel is converted into a pattern of all white dots or all black dots; and (2) when pixel-corresponding portions of each of the compression codes are separately inverted, also an N-dot pattern of a corresponding pixel is inverted.

However, the additional two conditions (1) and (2) cannot be satisfied with respect to all compression codes. In a preferred embodiment, most of the compression codes satisfy the conditions (1) and (2), but a minority of the compression codes cannot satisfy them.

In the system of the invention, the compression coding means may comprise means for inputting gradation data indicating a halftone image, means for holding predetermined correspondence relationships between gradation data and compression codes, and means for directly converting a gradation data into compression codes on the basis of the correspondence relationships.

According to the system of the invention, dot patterns for 2-pixel areas of an N-fold density image are limited to 4N kinds of dot patterns, and hence a high compression ratio can be attained. In addition, the compression codes are set so that, when the whole of each compression code is inverted, also dot patterns of a 2-pixel area are inverted. Even when a NOT logical operation is conducted on compression codes, therefore, it is possible to obtain the same results as those obtained when a NOT logical operation is conducted on an N-fold density image. Consequently, with respect to a NOT operation, the processing can be conducted while the compression codes remain as they are.

When the condition (1) is added, furthermore, even an AND or OR operation of compression codes satisfying the condition (1) and a normal image can obtain the same results as those obtained when an AND or OR logical operation is conducted on an N-fold density image and a normal image. When the condition (2) is added, even an XOR operation of compression codes satisfying the condition (2) and a normal image can obtain the same results as those obtained when an XOR logical operation is conducted on an N-fold density image and a normal image. Although not perfectly, therefore, AND, OR, and XOR operations can be conducted on compression codes as they are.

In a preferred embodiment, since most of the compression codes satisfy the conditions (1) and (2), AND, OR, and XOR operations can be conducted on compression codes as they are, without substantially producing a problem.

When the compression coding means is configured as described above, a gradation data can directly be converted into a compression code. When a host computer produces gradation data to output them as an N-fold density image via a printer or the like, therefore, processing inside the apparatus can fully be conducted by using only compression codes, and hence the memory capacity can be reduced to a value corresponding only to the compression codes.

BRIEF DESCRIPTION OF THE DRAWINGS

FIGS. 2(A) to 2(C) show the principle of 4-bit compression codes in the embodiment;

FIG. 3 is a view showing correspondence relationships between 4-bit compression codes and 8-dot patterns.

FIGS. 5(A) and 5(B) show results of verification of errors which may be produced in an output image as a result of the AND operation, for all the compression codes;

FIGS. 7(A) and 7(B) show results of verification of errors which may be produced in an output image as a result of the OR operation, for all the compression codes;

FIGS. 8(A), 8(B) and 8(C) show results of similar verification conducted in the case where an XOR operation of compression codes is conducted;

FIGS. 11 to 14 show halftone array data which are used for directly converting gradation data of 150 dpi into 4-bit compression codes;

FIGS. 15(A) to 15(C) show a chart showing a procedure in which, using the array data, 4-bit compression codes are directly obtained from gradation data of 150 dpi;

FIGS. 16(A) and 16(B) show a chart that specifically shows process results of FIGS. 15(A) to 15(C) in the case where all the four pixels A1 to A4 of FIG. 15(A) have the gradation di=64;

FIG. 17 is a view showing correspondence relationships between pixel-corresponding portions of 8-bit compression codes and 16-dot patterns in an embodiment wherein the compression system of the invention is applied to a 16-fold density image;

FIG. 18 is a view showing correspondence relationships between 8-bit compression codes and 32-dot patterns in which each relationship is produced by combining two relationships shown in FIG. 17; and FIGS. 19(A) and 19(B) show correspondence relationships between compression codes and dot patterns for four exceptional kinds of dot patterns.

DETAILED DESCRIPTION OF THE PREFERRED EMBODIMENTS

Hereinafter, embodiments of the invention will be described with reference to the drawings.

Figure 1:
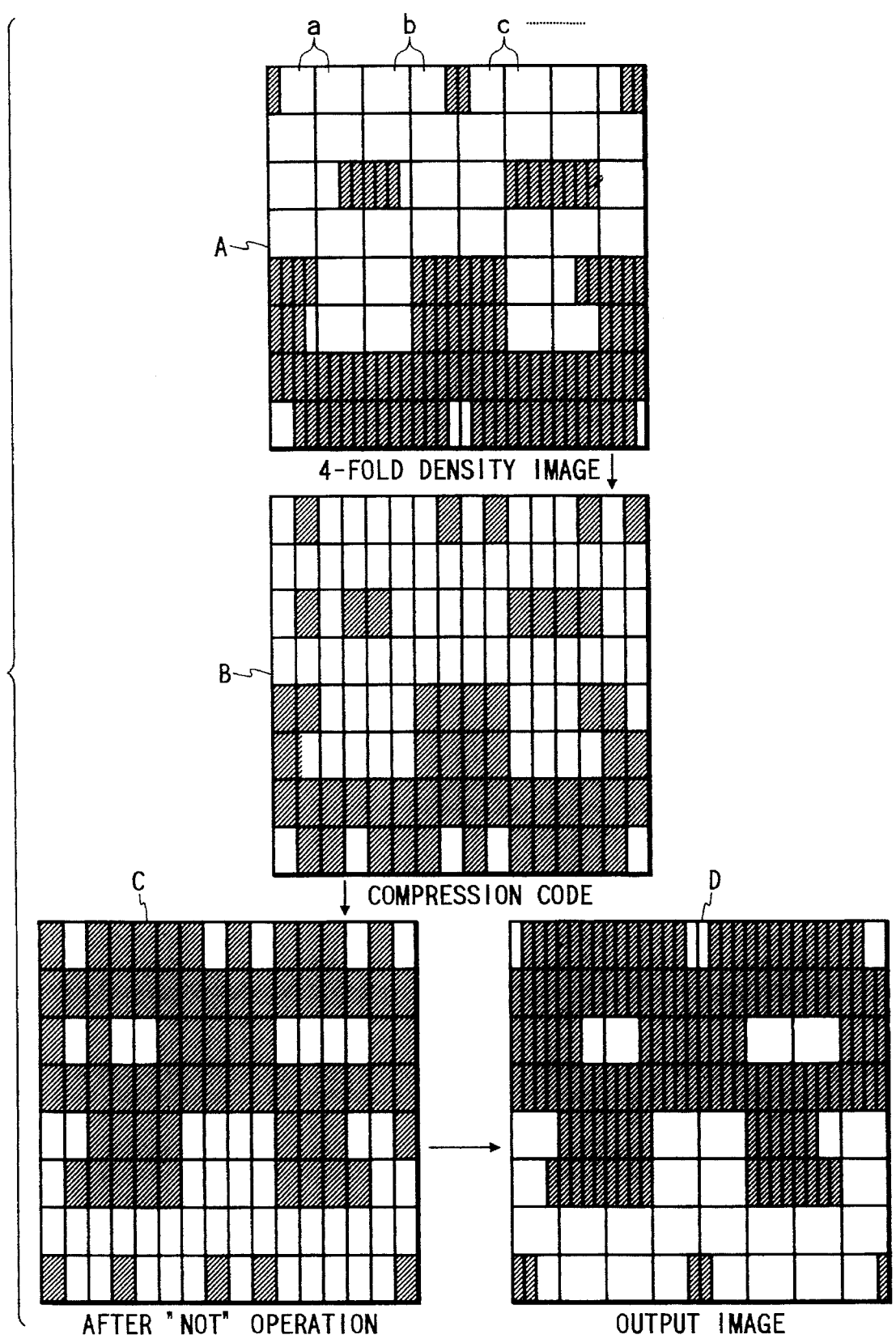
FIG. 1 is a diagram showing a specific example in which a compression coding system which is an embodiment of the invention is applied to a 4-fold density image to perform compress coding on the image, a NOT logical operation is conducted on the obtained compression codes, and the resulting codes are returned to a 4-fold density image.

FIG. 1 shows a specific example in which a compression coding system which is an embodiment of the invention is applied to a 4-fold density image to perform compress coding on the image, a NOT logical operation is conducted on the obtained compression codes, and the resulting codes are returned to a 4-fold density image.

image A shown in the uppermost portion of FIG. 1 is a 4-fold density image of, for example, 300 dpi vertical×1,200 dpi horizontal. Each square area in the 4-fold density image A is a pixel, and a strip-like area in each pixel is a dot. Each pixel consists of four dots which are horizontally arranged, and the halftone of each pixel is represented by the black and white pattern constituted by the four dots.

The 4-fold density image A is logically divided into sets of two pixels which are horizontally adjacent to each other (hereinafter, such a pixel set is referred to as "2-pixel area") a, b, c, . . . . The 8-bit black and white pattern in each 2-pixel area is converted into one compression code.

In order to increase the compression ratio, the same limitation as that in the conventional art is imposed on the black and white pattern which can be produced by 8 dots in each 2-pixel area. Specifically, a black and white pattern produced by 8 dots is always "white", "black", "white and black", or "black and white". That is, there is one or less black/white change. Two or more black and white changes (such as "white, black, and white" or "black, white, black") are not permitted. The dot patterns in the 4-fold density image A shown in FIG. 1 follow this limitation. This limitation allows patterns which can be produced from 8 dots, thus yielding 16 possible 8 dot patterns. Therefore, a compression code representing these 16 patterns requires only 4 bits. Thus, the memory capacity required for storing a 4-fold density image which has undergone compression coding is only two twice that required for storing a normal image.

This dot pattern limitation is a limitation imposed on the arrangement of black dots in a 2-pixel area, and means that black dots cannot freely be positioned. However, the horizontal size of a 2-pixel area is very small (in the case of 1,200 dpi horizontal, for example, 1/150 inch). Even when positions of black pixels in such a minute area are varied, the human eye recognizes that these patterns have the same tone, as far as the number of black pixels is concerned. Therefore, the dot pattern limitation does not substantially affect the image quality of a halftone image.

An image B shows a result of conducting compression coding on the 4-fold density image according to the system of the embodiment. An image C shows a result of conducting a NOT operation (inversion) on the compression coded image B. An image D shows a result of expanding the inverse compression coded image C to a 4-fold density image. When the output image D is compared with the black and white pattern of the original 4-fold density image, it will be noted that there is a strict NOT relationship between them.

In this way, according to the embodiment, a NOT operation conducted on compression codes produces a result identical to that produced when a NOT operation is conducted on a black and white pattern of pixels of a 4-fold density image.

As verified later by a specific example, when portions of the compression code used in the embodiment, respectively corresponding to pixels (i.e., the high order 2-bit portion or the low order 2-bit portion), are separately converted into "11" or "00" or inverted, the results in most cases are equivalent to those obtained when the black and white pattern of each pixel is converted into a pattern of all white dots or all black dots or inverted. In other words, logical operations such as AND, OR, and XOR of compression codes of a 4-fold density image and a normal image can be conducted.

FIGS. 2(A) to 2(C) show the principle of 4-bit compression codes in the embodiment.

As described above, when portions of a compression code which respectively correspond to pixels (i.e., the high order 2 bits or the low order 2 bits) are separately converted into "11" or "00" or inverted, also the 4-dot pattern of the corresponding pixel must be inverted or converted into a pattern of all white dots or all black dots. In order to satisfy this condition, correspondence relationships such as shown in FIG. 2(A) are set between a 2-bit code which is a pixel-corresponding portion and a 4-dot pattern of the pixel.

Specifically, 2-bit codes "00" and "11" correspond to 4-dot patterns "0000" and "1111" (in a dot pattern, "0" means a white dot and "1" a black dot), respectively. According to the correspondence relationships, the condition that, when a pixel-corresponding portion of an arbitrary 2-bit code is converted into "11" or "00", also the 4-dot pattern of the corresponding pixel is converted into a pattern of all white dots or all black dots is satisfied. Simultaneously, the condition that, when a pixel-corresponding portion of an arbitrary 2-bit code is inverted, also the 4-dot pattern of the corresponding pixel is inverted is satisfied.

A 2-bit code "01" corresponds to a 4-dot pattern "0001" or "1000", and a 2-bit code "10" corresponds to a 4-dot pattern "0111" or "1110". In the embodiment, one 2-bit code selectively corresponds to two 4-dot patterns. This selection is performed in the following manner. In consideration of the relationships between the two 4-dot patterns and the 4-dot pattern of the adjacent pixel in the 2-pixel area, one of the two 4-dot patterns which satisfies the above-mentioned dot-pattern limitation for a 2-pixel area is selected. According to the correspondence relationships, the condition that, when a pixel-corresponding portion of a code having "01" or "10" is inverted, also the 4-dot pattern of the corresponding pixel is inverted is satisfied.

Next, a 4-bit compression code is produced by combining two 2-bit codes of FIG. 2(A), thereby obtaining correspondence relationships between 4-bit compression codes and 8-dot patterns, such as shown in FIG. 2(B). As seen from the above description, according to the correspondence relationships, when portions of a 4-bit compression code which portions respectively correspond to pixels are inverted or converted into "11" or "00", also the black and white patterns of the corresponding pixels are similarly inverted or converted into a pattern of all white dots or all black dots. In other words, while compression codes remain as they are (i.e., without expanding them) a NOT operation can freely be conducted on a 4-fold density image, and AND, OR, and XOR operations of compression codes of a 4-fold density image and a normal image can freely be conducted.

The number of possible kinds of 4-bit compression codes is 16 in total. Among the codes, twelve kinds of codes are included in the correspondence relationships of FIG. 2(B), and four kinds of codes are not included. The four kinds of codes not included are 4-bit codes each consisting of a combination of 2-bit codes "01" and "10". With respect to the four codes, the above-mentioned dot-pattern limitation for the above-mentioned bit patterns cannot be satisfied even when the correspondence relationships of FIG. 2 (A) are applied.

With respect to the four compression codes, therefore, correspondences between the codes and 8-dot patterns are separately set. FIG. 2 (C) shows the results. The correspondence relationships of FIG. 2(C) are set so that at least inversion of the compression codes, that is, a NOT operation, can correctly be conducted.

In this way, the correspondence relationships between 16 kinds of compression codes and 8-dot patterns are eventually set. FIG. 3 shows the finally obtained correspondence relationships.

As seen from the above description, it is fully guaranteed that the correspondence relationships of FIG. 3 do not produce any problem in results of NOT operations conducted on compression codes. In an AND, OR, or XOR operation of a 4-fold density image and a normal image, there may arise an error with respect to the four kinds of compression codes shown in FIG. 2(C), but it is guaranteed that there arises no problem with respect to the twelve kinds of compression codes shown in FIG. 2(B).

Figure 4:
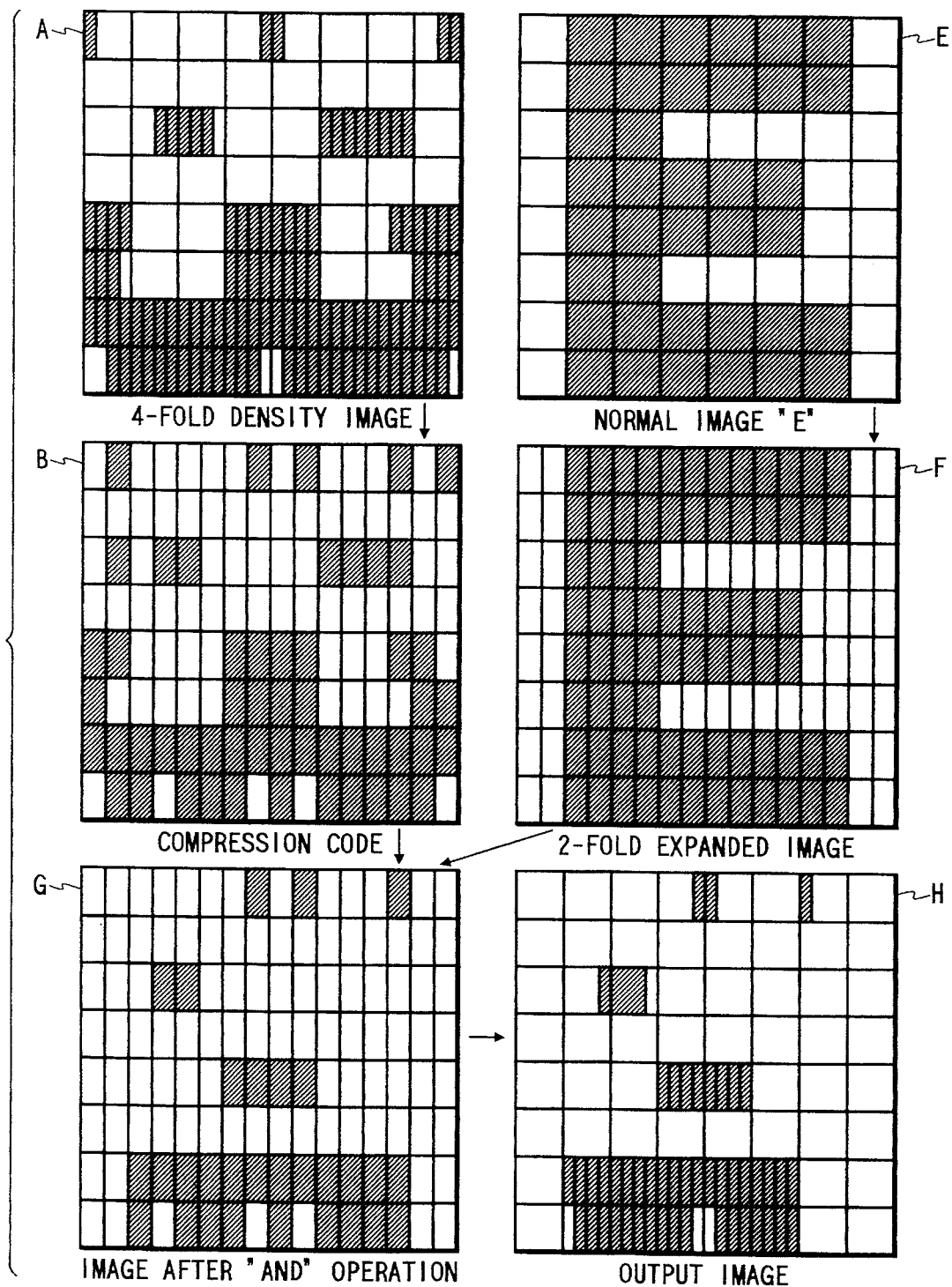
FIG. 4 is a diagram showing a specific example in which a 4-fold density image is converted into compression codes by using the correspondence relationships of FIG. 3, and an AND operation of the compression codes and a normal image is then conducted.

FIG. 4 shows a specific example in which a 4-fold density image is converted into compression codes by using the correspondence relationships of FIG. 3, and an AND operation of the compression codes and a normal image is then conducted.

In FIG. 4, an image A is an original 4-fold density image (for example, the resolution is 300 dpi vertical×1,200 dpi horizontal), and an image B (for example, 300 dpi vertical× 600 dpi horizontal) is an image obtained by conducting compress coding on the original image. An image E is a normal image (for example, 300 dpi vertical×300 dpi horizontal), and an image F is an image obtained by horizontally expanding the normal image by a factor of two (one pixel is simply represented by two dots) so as to attain the same resolution as the compression coded image B. The AND operation is conducted between the compression coded image B of the 4-fold density image and the horizontally 2-fold expanded image F of the normal image, thereby obtaining an image G. When the image G is expanded to a 4-fold density image, an output image H is obtained.

When the output image H is compared with the original 4-fold density image A and the normal image E, it seems that the AND operation is conducted in a substantially correct manner. In the above-mentioned resolution example, actually, the illustrated image (8 pixels×8 pixels) has a side edge of about 1/40 inch. Therefore, the results of the AND operation appear perfectly correct to the naked eye.

FIGS. 5(A) and 5(B) show results of verification of errors which may be produced in an output image as a result of the AND operation, for all the compression codes. FIG. 5(A) shows the case where only the high order 2 bits of each compression code are converted into "00", and FIG. 5(B) the case where only the low high order 2 bits are converted into "00".

As seen from FIGS. 5(A) and 5(B), for the twelve compression codes of FIG. 2(B), perfectly correct output dot patterns are obtained, and, only for the four compression codes of FIG. 2(C), errors may occur in which the output dot pattern is different from the correct one. However, all of these errors correspond in degree to one dot. In the above-mentioned resolution example, namely, such errors produce only an inaccuracy of 1/1,200 inch. The human eye cannot recognize such very minute errors.

Figure 6:
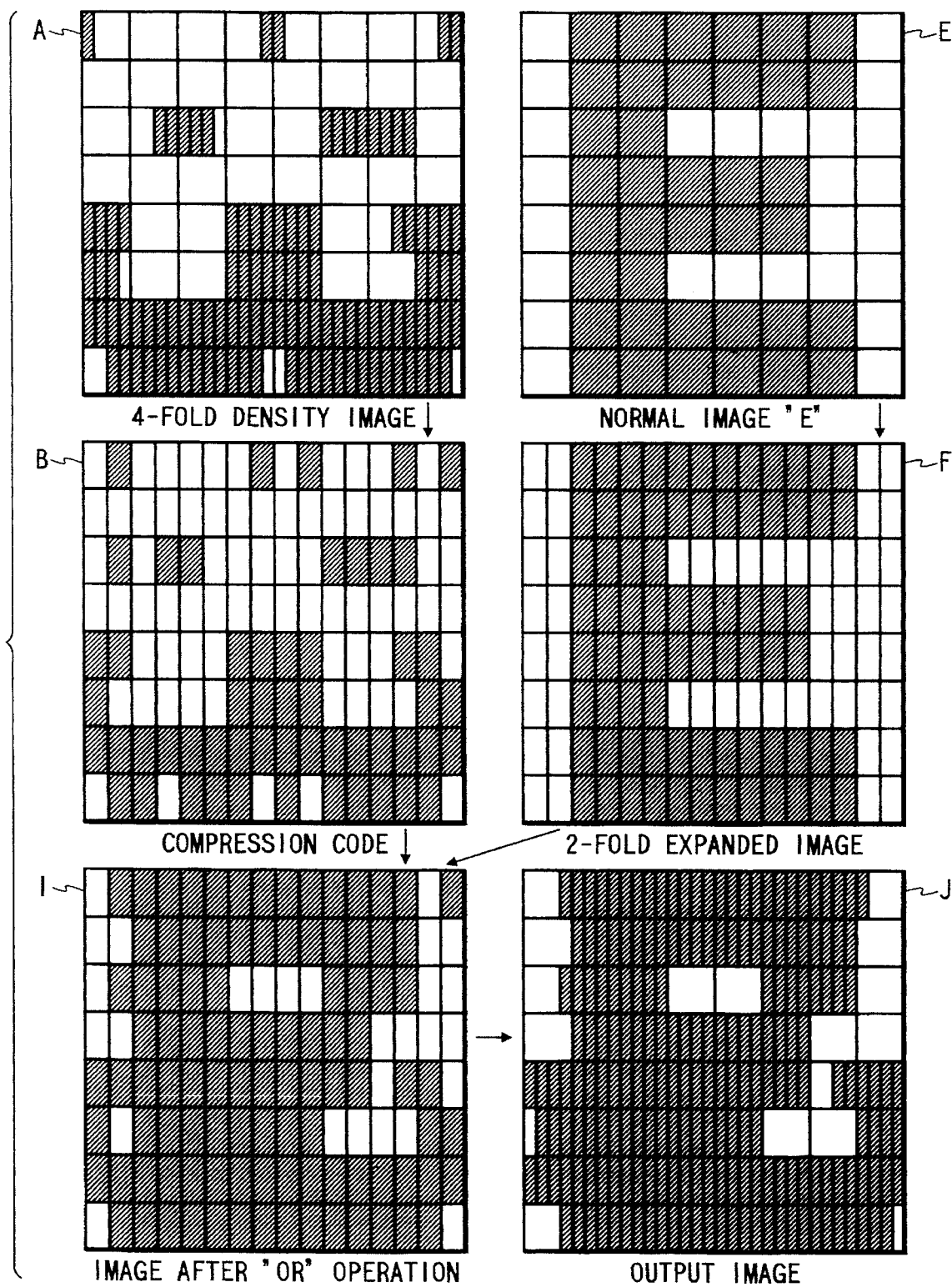
FIG. 6 is a diagram showing a specific example in which a 4-fold density image is converted into compression codes by using the correspondence relationships of FIG. 3, and an OR operation of the compression codes and a normal image is then conducted.

FIG. 6 shows a specific example in which a 4-fold density image is converted into compression codes by using the correspondence relationships of FIG. 3, and an OR operation of the compression codes and a normal image is then conducted.

In FIG. 6, images A, B, E, and F are identical with those shown in FIG. 4. The OR operation is conducted between the compression coded image B of the 4-fold density image and the horizontally 2-fold expanded image F of the normal image, with the result that an image I is obtained. When the image I is expanded to a 4-fold density image, an output image J is obtained.

When the output image I is compared with the original 4-fold density image A and the normal image E, it seems that the OR operation is conducted in a substantially correct manner. As described above, since the illustrated image actually has a side edge of about 1/40 inch, the results of the OR operation appear perfectly correct to the naked eye.

FIGS. 7(A) and 7(B) show results of verification of errors which may be produced in an output image as a result of the OR operation, for all the compression codes. FIG. 7(A) shows the case where only the low order 2 bits of each compression code are converted into "11", and FIG. 7(B) the case where only the high order 2 bits are converted into "11".

As seen from FIGS. 7(A) and 7(B), in the same manner as the case of AND, only for the four compression codes, very minute errors may occur which correspond in degree to one dot or produce only an inaccuracy of 1/1,200 inch. The human eye cannot recognize such very minute errors.

FIGS. 8(A), 8(B) and 8(C) show results of similar verification conducted in the case where an XOR operation of the compression codes and a normal image is conducted. FIG. 8(A) shows the case where the whole of each compression code is inverted, FIG. 8(B) the case where only the low order 2 bits of each compression code are inverted, and FIG. 8(C) the case where only the high order 2 bits of each compression code are inverted.

As seen from FIGS. 8(A) to 8(C), only in the cases where the low order or high order 2 bits are inverted, and only for the four compression codes, very minute errors may occur which correspond in degree to four dots or produce only an inaccuracy of 4/1,200 inch. Also these errors are minute, and the human eye hardly recognizes such minute errors. Furthermore, the phenomena that errors occur only in the cases where the low order or high order 2 bits are inverted mean that, when XOR is conducted on a certain area of an image, an error does not occur in the area but occurs only in the boundary of the area. When a photograph and a character are subjected to XOR, for example, the boundary is constituted by the boundary of the photograph and the character. Generally, the tone is largely changed at such a boundary, and hence a minute error is more hardly recognized to the human eye.

Figure 9:
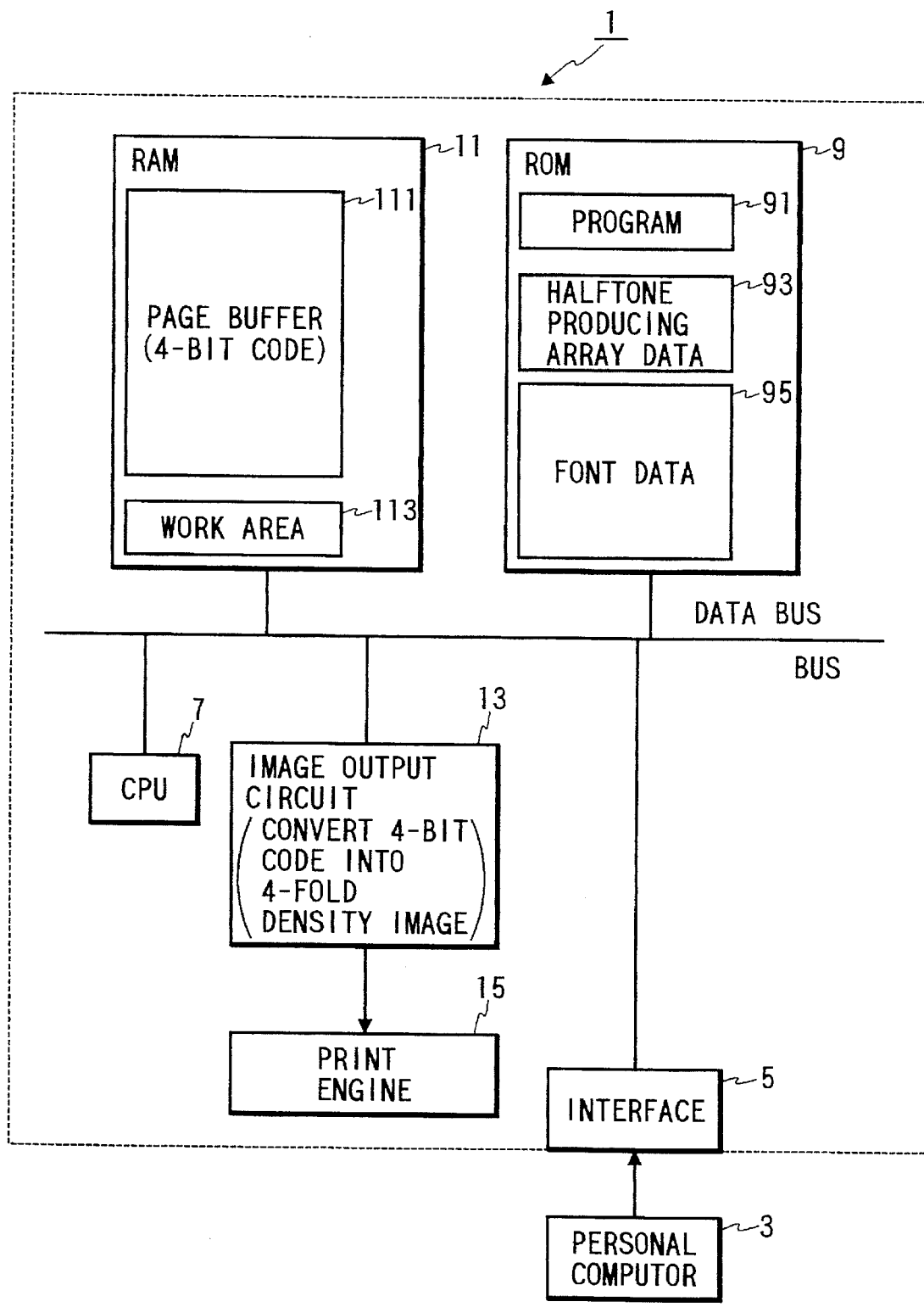
FIG. 9 is a block diagram showing an embodiment of a terminal printer which uses the compression coding system described above to conduct a process of a 4-fold density image and a normal image.

FIG. 9 is a block diagram showing an embodiment of a terminal printer which uses the compression coding system described above to conduct a process of a 4-fold density image and a normal image.

In FIG. 9, the printer 1 comprises: an interface 5 for receiving image data from a personal computer 3; a CPU 7 for processing a received image; a ROM 9 which stores programs for the CPU and other fixed information; a RAM 11 which has a work area 113 for the CPU, and a page buffer 111 for holding images of 4-bit codes (compression codes) in the unit of page; an image output circuit 13 which converts a 4-bit code image in the page buffer into a 4-fold density image; and a print engine 15 which receives an output from the image output circuit 13 and actually prints out a 4-fold density image. In addition to the programs 91, halftone producing array data 93 which is used for directly producing a compression coded image from data of a halftone image received from the personal computer 3, and font data 95 such as characters and symbols are stored in the ROM 9.

Figure 10:
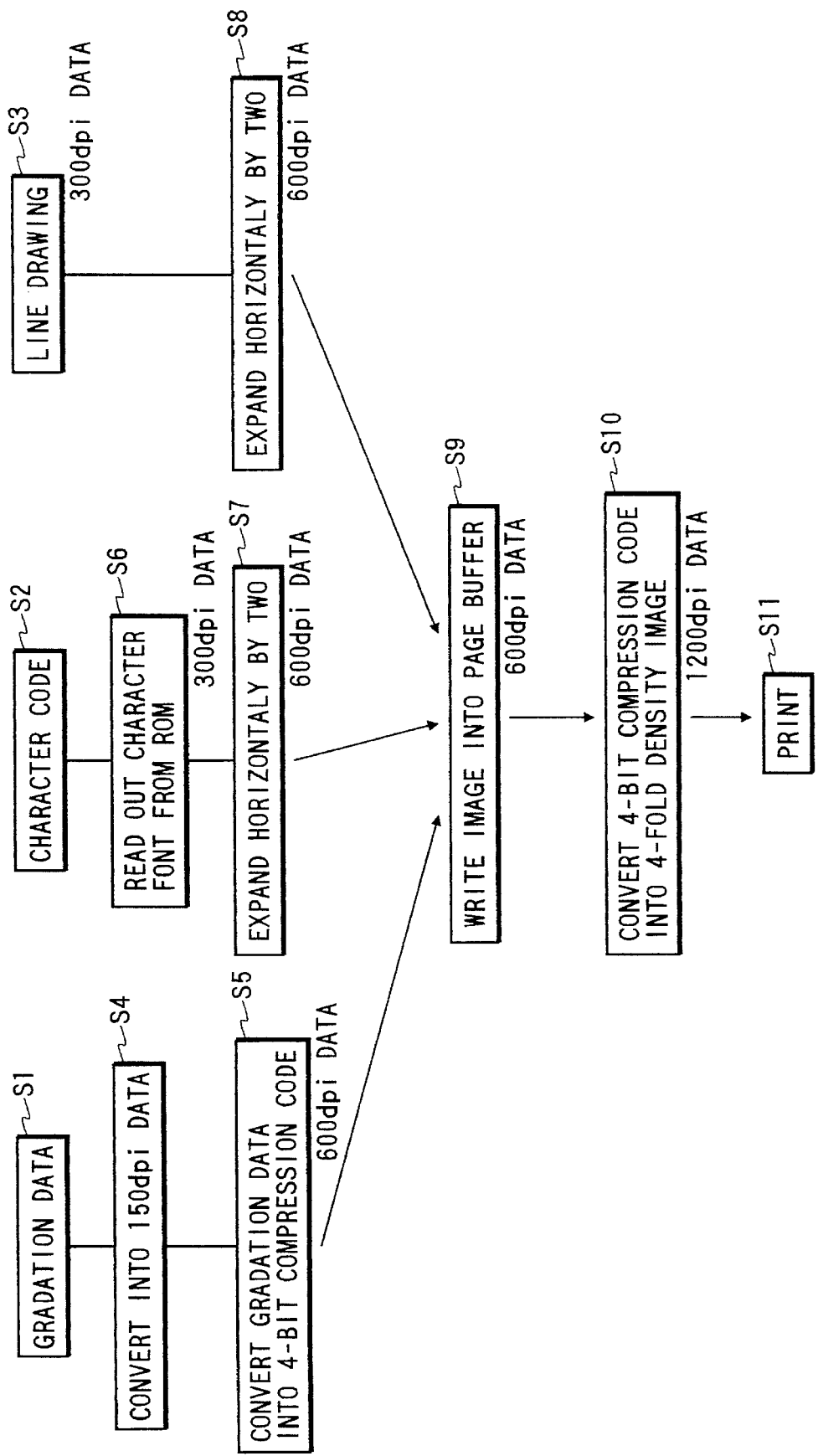
FIG. 10 is a flowchart showing the flow of the process which is conducted on image data by the printer of FIG. 9.

FIG. 10 shows the flow of the process which is conducted on image data by the printer.

As shown in steps S1, S2, and S3 of FIG. 10, image data are transmitted from the host computer in one of the three kinds of forms, gradation data (S1), character codes (S2), and a bit image (S3).

The gradation data are data indicative of gradations (for example, 256 scales) of pixels of a halftone image. When the printer receives the gradation data, they are converted into gradation data of 150dpi vertical×150 dpi horizontal (step S4). Using the halftone producing array data 93 in the ROM 9, the gradation data are converted into a 4-bit compression coded image (300 dpi vertical×600 dpi horizontal) such as that described above (step S5).

When the printer receives a character code (step S2), a character font is read out from the ROM 9, and a normal image of 300 dpi vertical×300 dpi horizontal such as that described above is produced (step S6). Then the normal image is horizontally expanded by the factor of two in the aforementioned manner so as to obtain an image having the resolution of 300 dpi vertical×600 dpi horizontal which is equal to that of the compression coded image (step S7).

When the printer receives a bit image or a normal image of 300 dpi vertical×300 dpi horizontal such as a line drawing (step S3), also the normal image is horizontally expanded by the factor of two so as to obtain an image of 300 dpi vertical×600 dpi horizontal (step S8).

As described above, a received image of any kind is once converted into an image of the same resolution as that of a compression coded image. Thereafter, the image is written into the page buffer 111 of the RAM 11 (step S9). This writing may be conducted in one of operations including overwrite, NOT, AND, OR, and XOR. In the writing, the editing process is conducted while using the 4-bit compression codes as they are, such as those described above.

Next, the 4-bit compression codes in the page buffer 111 which have undergone the editing process are sequentially read out, and converted by the image output circuit 13 into 8-dot patterns of a 4-fold density image (step S10). The engine 15 receives the patterns and conducts the printing operation (step S11).

FIGS. 11 to 14 show an example of halftone array data (the reference numeral 93 of FIG. 9 which are used for directly converting gradation data of 150 dpi into 4-bit compression codes.

In the array data, eight compression codes code(di, p) which are identified by position numbers p=0 to 7 are set so as to correspond to the gradations di of 0 to 255 indicated by the gradation data. In the figures, the gradations di are represented in decimal notation, and the compression codes code(di, p) in hexadecimal notation. When represented by binary notation, each data has 4 bits.

FIGS. 15(A), 15(B) and 15(C) show a procedure in which, using the array data, 4-bit compression codes are directly obtained from gradation data of 150 dpi×150 dpi.

First, as shown in FIG. 15(A), gradation data d1 to d4 of four pixels A1 to A4 of a 2×2 matrix are taken out from the gradation data of 150 dpi. As shown in FIG. 15(B), each of the four pixels A1 to A4 is divided into two areas which are vertically arranged (namely, 2-pixel areas of 300 dpi), and the eight 2-pixel areas a1 to a8 of the resulting 4×2 matrix are allocated with position numbers p=0 to 7, respectively. For each of the eight 2-pixel areas a1 to a8, the compression code code(di, p) corresponding to its gradation data di and position number p is read out from the array data. As a result, as shown in FIG. 15(C), the 4-bit compression codes for the 2-pixel areas a1 to a8 of the resulting 4×2 matrix are determined.

FIGS. 16(A) and 16(B) specifically show process results of FIGS. 15(A) to 15(C) in the case where all the four pixels A1 to A4 of FIG. 15(A) have the gradation di=64.

As shown in the uppermost row of the left column of FIG. 12, the gradation di=64 has array data of compression codes of 4, 1, 2, 8, 1, 4, 8, and 2. As shown in FIG. 16(A), when the eight compression codes of 4, 1, 2, 8, 1, 4, 8, and 2 are allocated to the 2-pixel areas corresponding to the respective position numbers p, whereby the 4-bit compression codes are determined.

As described above, in the printer, the 4-bit compression codes are subjected as they are to the image editing process, and finally converted into dot patterns of a 4-fold density image in a sequential manner in the final step of transmitting them to the print engine.

FIG. 16(B) shows an output image of 4-fold density which is printed out on the basis of the compression codes. In the 4-fold density image, black dots are arranged along lines which are respectively inclined by 45 degree with respect to the vertical and horizontal lines of the image (hereinafter "45-deg arrangement" when applicable). This 45-deg arrangement is a known technique for improving the appearance of an image. In the procedure shown in FIGS. 15(A) to 15(C), the 2-pixel areas a1 to a8 of the resulting 4×2 matrix are allocated with compression codes corresponding to the respective position numbers p because of the following reason: In order to obtain the above-mentioned 45-deg arrangement, the position (right or left) where a black dot(s) are eccentrically located in a 2-pixel area is determined in accordance with the relative position in the matrix.

In the above, an embodiment in which the invention is applied to a 4-fold density image has been described. According to the invention, a halftone image is directly converted from original gradation data into 4-bit compression codes, the compression codes as they are subjected to processing or an editing process of the image and a normal image, and the compression codes are returned to dot patters of 4-fold density in the output step which is the final step.

Consequently, a memory capacity required for the process is only two times as that required for processing a normal image so that the required memory capacity is fully reduced one half of that of the conventional one. Moreover, errors, which may partially be caused in the process of editing compression codes, are very minute ones which cannot be recognized to the naked eye. Therefore, such errors do not produce a substantial problem.

FIGS. 17 to 19(B) show an embodiment wherein the compression system of the invention is applied to a 16-fold density image.

In a 16-fold density image, one pixel consists of 16 dots. Since the limitation that there is one or less black and white change is disposed as described above, the 2-pixel areas of the image, i.e., 32 dots can produce 64 patterns in total. The 64 patterns of the 2-pixel areas are allocated with compression codes, respectively. Each of the compression codes requires 6 bits. Since it is difficult to handle 6-bit codes, however, 8-bit compression codes are actually used.

FIG. 17 shows correspondence relationships between pixel-corresponding portions of 8-bit compression codes (high order 4 bits or the low order 4 bits) and 16-dot pattern of a pixel. In the same manner as the case of a 4-fold density image, also the correspondence relationships are determined so that, when a pixel-corresponding portion of a compression code is inverted or converted into "1111" or "0000", also the 16-bit pattern of the corresponding pixel is similarly inverted or converted into a pattern of all white dots or all black dots.

FIG. 18 shows correspondence relationships between 8-bit compression codes and 32-dot patterns in which each relationship is produced by combining two relationships shown in FIG. 17. In FIG. 18, only 60 kinds of patterns are shown which can satisfy the above-mentioned limitation for dot patterns.

With respect to the remaining 4 kinds of dot patterns, compression codes are separately set without regard to the relationships of FIG. 17. In this case, compression codes such as shown in FIG. 19(A) are determined so that, when the whole of an 8-bit compression code is inverted, also the whole of a 32-dot pattern is inverted. Using extra compression codes, with respect to the same 4 kinds of dot patterns, compression codes such as shown in FIG. 19(B) are determined so that, when upper or lower 4 bits of a compression code are separately inverted, also the 16-dot pattern of the corresponding pixel is inverted.

In this way, the 64 kinds of compression codes shown in FIGS. 18, 19(A) and 19(B) are set. The use of these compression codes allows the editing process to be conducted while the compression codes remain as they are. In the same manner as the case of a 4-fold density image, no error occurs in a NOT operation. Because of the additional four codes shown in FIG. 19(B), moreover, no error occurs also in an XOR operation. In AND and OR operations, errors may occur only for the four patterns of FIGS. 19(A) and 19(B). When a normal image of 300 dpi is used, however, such errors are very minute or have a size of $\frac{1}{1,200}$ inch, and hence such minute error cannot be recognized to the human eye.

When 8-bit compression codes are used, it is possible to distinguish 256 patterns from each other so that compression to a 64-fold density halftone image is conducted at the maximum. When M-bit compression codes are used and the maximum density of a compressible halftone image is an N-fold density, generally, the following relationship holds:

$$4N=2^M.$$

The invention may be executed in various densities and manners other than those of the embodiments shown herein.

According to the invention, in a system for conducting compression coding on an N-fold density halftone image, a process of an N-fold density image, or an edition of an N-fold density image and a normal image can be conducted on compression codes, as they are, (i.e., without expanding them), while attaining a compression ratio as high as that of the prior art, whereby processing of an N-fold density image is completely conducted by using only a memory of a capacity which is required for the compression codes.

What is claimed is:

1. A system for compressing an N-fold density halftone image which is comprised of pixels, where N is a number of dot areas of each of the pixels, the system comprising:

a set of predefined compression codes, each of the compression codes corresponding to one of a set of only 4N predefined dot patterns of 2N dots, each of the 4N dot patterns having therein at most one of a change from black to white and a change from white to black, the 4N dot patterns defining permitted dot patterns for representing a given 2-pixel area of said halftone image, the given 2-pixel area including two horizontally adjacent ones of the pixels, each one of the 4N dot patterns having two pixel-corresponding portions each of the two pixel-corresponding portions corresponding to a respective one of a set of only 2N patterns of N dots, and each pertaining to a respective pixel of the given 2-pixel area; and means for conducting compression coding on the halftone image by using the predefined compression codes;

wherein the predefined compression codes are defined so that for any given one of the predefined compression codes:

the given one of the predefined compression codes corresponds to a given one of the 4N dot patterns;

a result of inverting the given one of the predefined compression codes is another one of the predefined compression codes which corresponds to another one of the 4N dot patterns, and the another one of the 4N dot patterns is an inverse of the given one of the 4N dot patterns.

2. A method for compressing an N-fold density halftone image which is comprised of pixels, where N is a number of dot areas of each of the pixels, the pixels each being in one of a plurality of 2-pixel areas, each of the 2-pixel areas including two horizontally adjacent ones of the pixels, the method comprising:

defining only 4N dot patterns for representing any of the 2-pixel areas, each of the 4N dot patterns having therein at most one of a change from black to white and a change from white to black;

providing compression codes each corresponding to one of the 4N dot patterns, each of the compression codes having two pixel-corresponding portions, each of the two pixel-corresponding portions corresponding to one of a set of only 2N patterns of N dots, and each pertaining to a respective pixel of one of the 2-pixel areas; and conducting compression coding on the halftone image by using the compression codes;

wherein the compression codes are defined so that for any give one of the compression codes:

the given one of the compression codes corresponds to a given one of the 4N dot patterns, a result of inverting the given one of the compression codes is another one of the compression codes which corresponds to another one of the 4N dot patterns, and the another one of the 4N dot patterns is an inverse of the given one of the 4N dot patterns.

3. A method according to claim 2, wherein:

at least two of the compression codes each have a respective one of the pixel-corresponding portions thereof which has one of "1" in all bits and "0" in all bits, and which has, as the corresponding one of the set of 2N patterns of N dots, one of all white dots and all black dots.

4. A method according to claim 2 or 3, wherein two or more of the compression codes each have a following relationship: when one of the respective pixel-corresponding portions thereof is separately inverted, the dots of the corresponding one of the set of 2N patterns of N dots also are inverted.

5. A method according to claim 2, wherein said compressing step further comprises the steps of:

inputting gradation data indicating the halftone image;

holding predetermined correspondence relationships between the gradation data and the compression codes; and directly converting the gradation data into the compression codes on the basis of the correspondence relationships.

6. The method according to claim 2, wherein, when N is set to be four, the compression codes are allocated to the 4N dot patterns as follows:

a compression code "0000" for a dot pattern "00000000";
a compression code "0001" for a dot pattern "00000001";
a compression code "0010" for a dot pattern "00000111";
a compression code "0011" for a dot pattern "00001111";
a compression code "0100" for a dot pattern "10000000";
a compression code "0101" for a dot pattern "00000011";
a compression code "0110" for a dot pattern "00111111";
a compression code "0111" for a dot pattern "00011111";
a compression code "1000" for a dot pattern "11100000";
a compression code "1001" for a dot pattern "11000000";
a compression code "1010" for a dot pattern "11111100";
a compression code "1011" for a dot pattern "01111111";
a compression code "1100" for a dot pattern "11110000";
a compression code "1101" for a dot pattern "11111000";
a compression code "1110" for a dot pattern "11111110"; and
a compression code "1111" for a dot pattern "11111111",
where, in the dot patterns, "0" represents white and "1" represents black.

7. The method according to claim 2, wherein each of the compression codes is M bits in length, where M is determined by a following equation, $$4N=2^M.$$

8. An image data output device for an output image edited from an N-fold density halftone image which is comprised of pixels, where N is a number of dot areas of each of the pixels, the pixels each being in one of a plurality of 2-pixel areas, each of the 2-pixel areas including two horizontally adjacent ones of the pixels, said image data output device comprising:

means for receiving a received dot pattern which is one of a set of only 4N dot patterns defined for representing any of the 2-pixel areas, each of the 4N dot patterns having therein at most one of a change from black to white and a change from white to black;

means for storing compression codes, each corresponding to one of the 4N dot patterns, each of the compression codes having two pixel-corresponding portions, each of the two pixel-corresponding portions corresponding to one of a set of only 2N patterns of N dots, and each pertaining to a respective pixel of one of the 2-pixel areas;

means for converting the received dot pattern into the corresponding one of the compression codes;

means for editing the corresponding one of the compression codes thus converted such that the corresponding one of the compression codes is subjected to a logical operation to produce an edited one of the compression codes;

means for returning the edited one of the compression codes to the corresponding one of the 4N dot patterns which corresponds to the edited one of the compression codes to provide a returned dot pattern; and means for indicating the returned dot pattern as the output image, wherein the compression codes are defined so that for any given one of the compression codes:

the any given one of the compression codes corresponds to a given one of the 4N dot patterns, a result of inverting the any given one of the compression codes is another one of the compression codes corresponding to another one of the 4N dot patterns, and the another one of the 4N dot patterns is an inverse of the given one of the 4N dot patterns.

9. An image data output device according to claim 8, wherein:

at least two of the compression codes each have a respective one of the pixel-corresponding portions thereof which has one of "1" in all bits and "0" in all bits, and which has, as the corresponding one of the set of 2N patterns of N dots, one of all white dots and all black dots.

10. An image data output device according to claim 8 or 9, wherein two or more of the compression codes each have a following relationship: when one of the respective pixel-corresponding portions thereof is separately inverted, the dots of the corresponding one of the set of 2N patterns of N dots also are inverted.

11. An output image data according to claim 8, wherein the compression codes are each M bits in length, where M is determined by a following equation, $$4N=2^M.$$

12. A computer-readable medium embodying a computer program for compressing an N-fold density halftone image which is comprised of pixels, where N is a number of dot areas of each of the pixels, the computer program comprising the steps of:

providing a set of predefined compression codes, each of the compression codes corresponding to one of a set of only 4N predefined dot patterns of 2N dots, each of the 4N dot patterns having therein at most one of a change from black to white and a change from white to black, the 4N dot patterns defining permitted dot patterns for representing a given 2-pixel area of said halftone image, the given 2-pixel area including two horizontally adjacent ones of the pixels, each one of the 4N dot patterns having two pixel-corresponding portions, each of the two pixel-corresponding portions corresponding to a respective one of a set of only 2N patterns of N dots, and each pertaining to a respective pixel of the given 2-pixel area; and conducting compression coding on the halftone image by using the predefined compression codes;

wherein the predefined compression codes are defined so that for any given one of the predefined compression codes:

the given one of the predefined compression codes corresponds to a given one of the 4N dot patterns, a result of inverting the given one of the predefined compression codes is another one of the predefined compression codes which corresponds to another one of the 4N dot patterns, and the another one of the 4N dot patterns is an inverse of the given one of the 4N dot patterns.

13. The computer-readable medium embodying the computer program according to claim 12, wherein:

at least two of the predefined compression codes are set so that, for each of the at least two predefined compression codes, one of the two pixel-corresponding portions thereof has one of "1" in all bits and "0" in all bits, and the one of the two pixel-corresponding portions has, as the corresponding one of the 2N patterns of N dots, one of all white dots and all black dots.

14. The computer-readable medium embodying the computer program according to claim 12 or 13, wherein:

two or more of the predefined compression codes are set so that, for each of the two or more predefined compression codes, when one of the two pixel-corresponding portions thereof is separately inverted, the dots of the corresponding one of the 2N patterns of N dots also are inverted.

15. The computer-readable medium embodying the computer program according to claim 12, wherein the conducting step comprises the stops of:

inputting gradation data indicating the halftone image;

holding predetermined correspondence relationships between the gradation data and the compression codes; and directly converting the gradation data into the compression codes on the basis of the correspondence relationships.

16. The computer-readable medium embodying the computer program according to claim 12, wherein, when N is set to be four, the predefined compression codes are allocated to the 4N dot patterns as follows:

a compression code "0000" for a dot pattern "00000000";

a compression code "0001" for a dot pattern "00000001";

a compression code "0010" for a dot pattern "00000111";

a compression code "0011" for a dot pattern "00001111";

a compression code "0100" for a dot pattern "10000000";

a compression code "0101" for a dot pattern "00000011";

a compression code "0110" for a dot pattern "00111111";

a compression code "0111" for a dot pattern "00011111";

a compression code "1000" for a dot pattern "11100000";

a compression code "1001" for a dot pattern "11000000";

a compression code "1010" for a dot pattern "1111100";

a compression code "1011" for a dot pattern "01111111";

a compression code "1100" for a dot pattern "11110000";

a compression code "1101" for a dot pattern "11111000";

a compression code "1110" for a dot pattern "11111110"; and a compression code "1111" for a dot pattern "11111111", where, in the dot patterns, "0" represents white and "1" represents black.

17. The computer-readable medium embodying the computer program according to claim 12, wherein the predefined compression codes each have a respective length of M bits, where M is determined by the following equation:

$$4N=2^M.$$

* * * * *